Oct. 10, 1944.    S. MARVIN    2,360,069
CONVEYER MOUNTING AND FEED UNIT
Filed Feb. 8, 1943    2 Sheets-Sheet 1
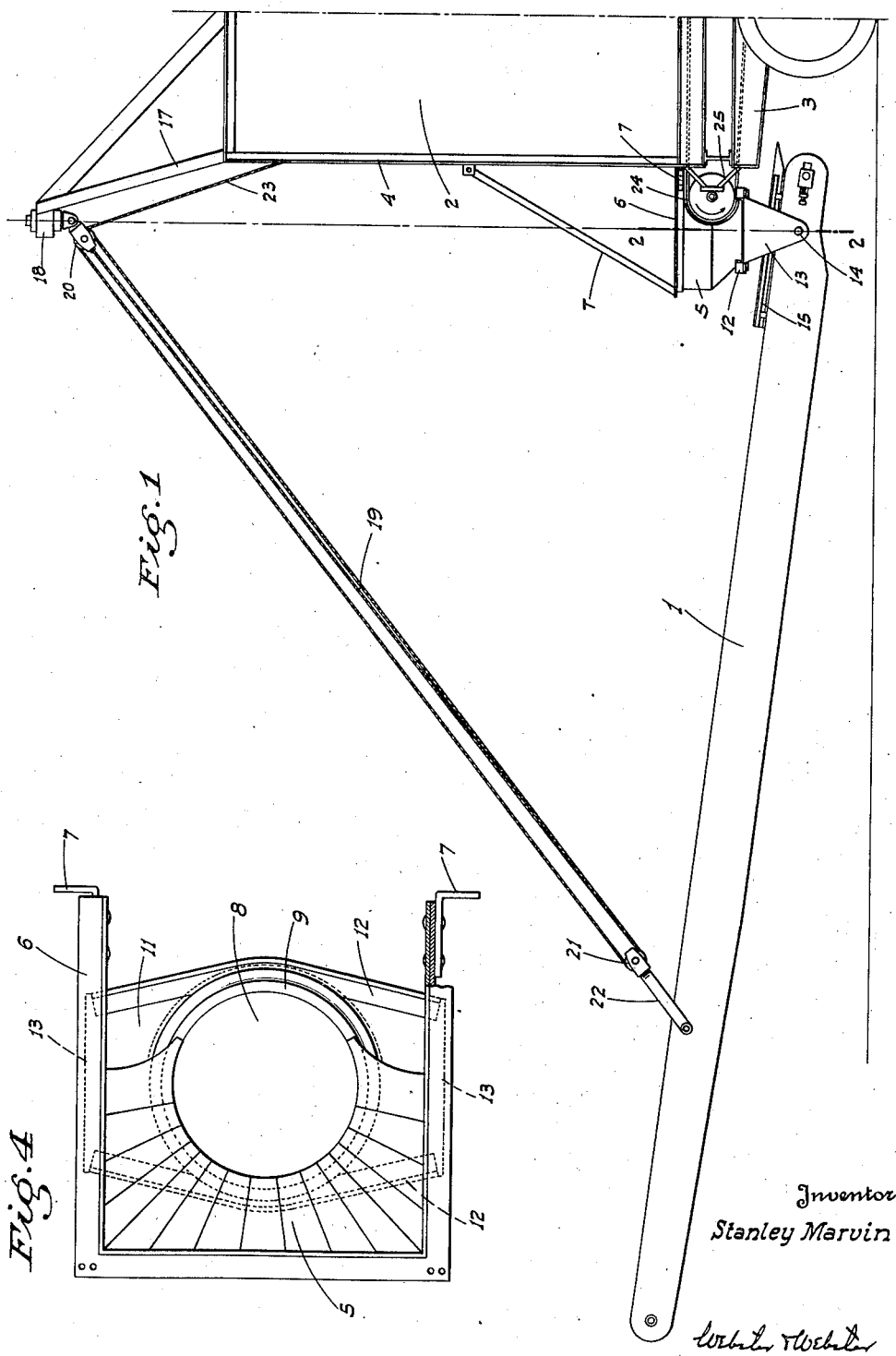
Inventor
Stanley Marvin
Attorneys Oct. 10, 1944.  S. MARVIN  2,360,069
CONVEYER MOUNTING AND FEED UNIT
Filed Feb. 8, 1943  2 Sheets-Sheet 2
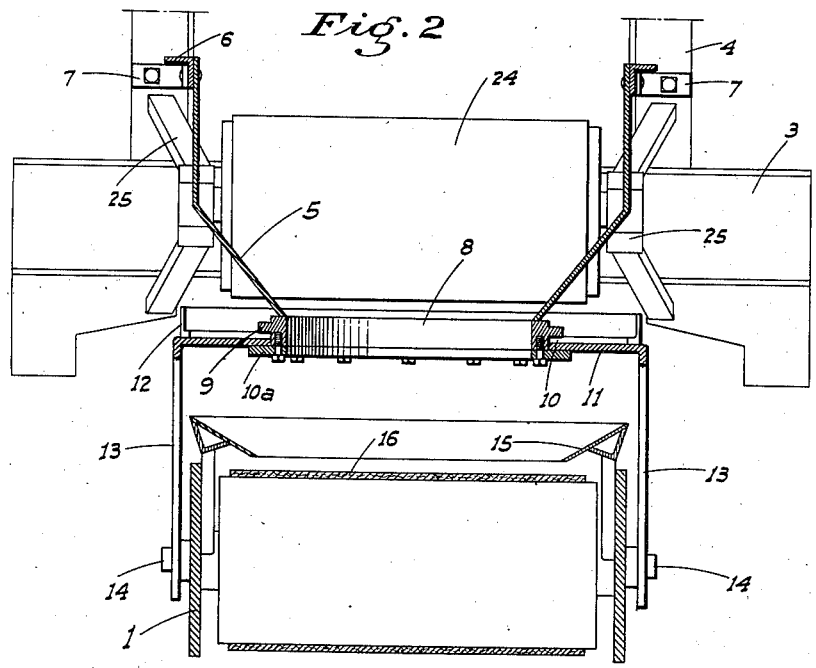
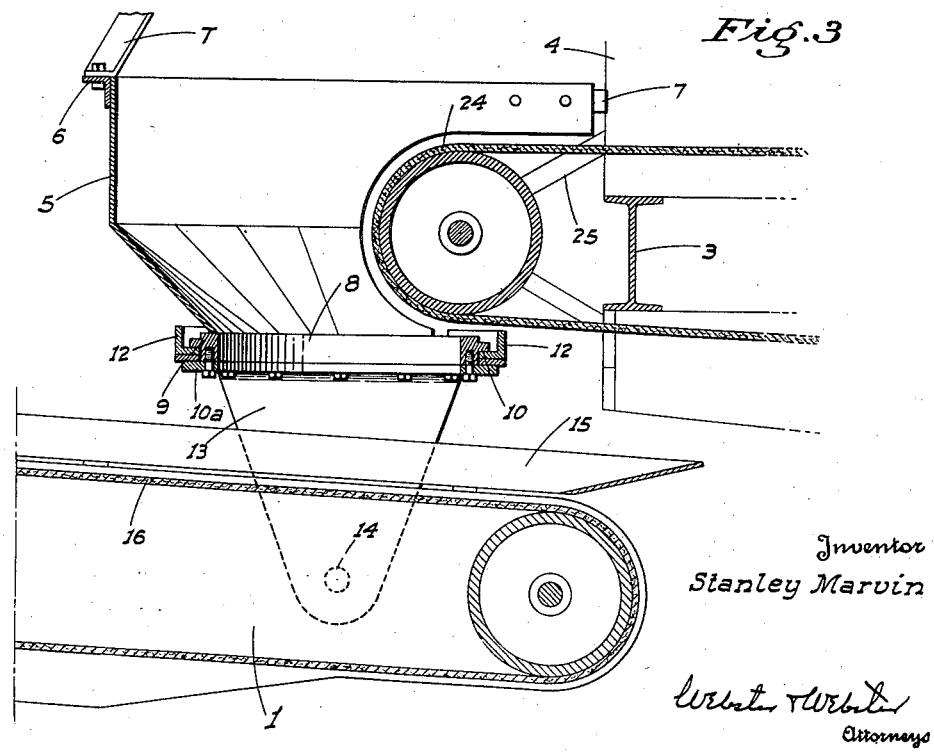
Inventor
Stanley Marvin
Webster & Webster
Attorneys Patented Oct. 10, 1944

2,360,069

UNITED STATES PATENT OFFICE 2,360,069

CONVEYER MOUNTING AND FEED UNIT

Stanley Marvin, Lodi, Calif., assignor to Super Mold Corporation of California, Lodi, Calif., a corporation of California Application February 8, 1943, Serial No. 475,091

3 Claims. (Cl. 198—53)

The present invention relates in general to an improved mounting and feed unit for an endless belt conveyer, and in particular the invention is directed to a mounting and feed unit for an endless, boom-type tailings conveyer of a mining or ore treating machine or the like.

One of the objects of this invention is to provide, in combination with an endless, boom-type tailings conveyer which is adapted for both horizontal and vertical adjustment about corresponding axes adjacent its inner end, a unique feeding assembly operative to feed material from the mining machine onto said tailings conveyer from a fixed point above the inner end portion of the latter and regardless of its position of adjustment, either horizontally or vertically.

A further object of this invention is to provide a structure as in the preceding paragraph in which the feeding assembly includes a hopper, said hopper having a universal mount formed therewith which supports the inner end portion of the tailings conveyer in constant material-receiving alinement or position under and relative to said hopper irrespective of vertical or lateral swinging of the conveyer.

An additional object of this invention is to provide a conveyer mounting and feed unit which includes a hopper mounted in a fixed material receiving position, a horizontal rotary collar mounted on the lower portion of the hopper in concentric and surrounding relation to the hopper discharge opening, a pair of arms depending from the collar beyond opposite sides of said hopper opening, an endless boom-type tailings conveyer, and means pivoting said conveyer adjacent its inner end between the lower end portions of said depending arms for vertical swinging movement; horizontal movement of the conveyer being accomplished through the medium of the rotary collar assembly.

It is also an object of this invention to provide a structure as in the preceding paragraph in which the mining machine, of which the conveyer mounting and feed unit forms a part, includes a swivel headblock mounted on said machine some distance above the hopper with the vertical axes of said headblock and hopper being in alinement, and a block and tackle unit; the block at the outer end of the block and tackle unit being pivotally connected to the conveyer adjacent the outer end of the latter, and the block at the inner end of the unit being pivotally connected to said swivel headblock.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the mounting and feeding unit as arranged in supporting relation between the inner end of an endless, boom-type tailings conveyer and the frame of a mining machine.

Figure 2 is an enlarged fragmentary cross sectional elevation of the conveyer mounting and feed unit on line 2—2 of Fig. 1.

Figure 3 is an enlarged fragmentary longitudinal sectional elevation of the conveyer mounting and feed unit.

Figure 4 is an enlarged plan view of the hopper and rotary collar assembly, detached.

Referring now more particularly to the characters of reference on the drawings, the numeral 1 indicates generally an endless, boom-type tailings conveyer, preferably driven by an electric motor (not shown) mounted in unitary relation thereon; the conveyer projecting outwardly and normally at an upward slope from one end of a mining machine, indicated generally at 2. The mining machine includes a main or bed frame 3, and an upstanding frame structure 4.

The conveyer mounting and feed unit which is the subject of this invention comprises the following:

A hopper 5 is mounted in connection with and depends from a horizontal top frame 6 which is secured by attachment brackets 7 to and projects outwardly from the frames 3 and 4 of the mining machine 2. Side tension bars T extend from the outer end of frame 6 upwardly and inwardly to connection with the upstanding frame structure 4 some distance above the hopper whereby to further support the latter. The hopper 5 is disposed some distance above ground level and at its lower end includes a circular discharge opening 8, which is surrounded by a fixed horizontal ring 9; said ring having an outwardly opening, annular channel 10 formed therein, the bottom of which is formed by a removable ring 10a.

A collar plate 11 surrounds the ring 9 and projects into the channel 10 in supported and turnable relation; said collar plate 11 being elongated on opposite ends, as shown, and includes suitable reinforcing elements 12 along opposite sides.

Vertical legs 13 are fixed in connection with and depend from opposite ends of said collar plate, and these legs straddle the inner end portion of the tailings conveyer 1, the latter being fitted with oppositely projecting trunnions 14 which are journaled in connection with the legs. The trunnions 14 are disposed ahead of the inner end of conveyer 1 a distance somewhat greater than the diameter of the hopper discharge opening 8. An upwardly and outwardly inclined deflector pan 15 of generally U shape in plan is mounted on the conveyer 1 under the hopper 5; the legs or sides of said deflector pan overlying opposite edges of the top run of the conveyer belt 16 of conveyer 1 in laterally spaced relation to corresponding sides of the hopper opening 8, while the end portion of said pan overlies and intersects belt 16 some distance rearwardly of the opening 8.

The upstanding frame structure 4 of the mining machine 2 includes a mast or upwardly projecting A-frame 17 which is fitted with a swivel headblock 18 overhanging hopper 5; the vertical axes of said headblock and the hopper being in vertical alinement and such line intersecting the horizontal axial line of trunnions 14, as clearly indicated in Fig. 1.

The numeral 19 indicates a block and tackle unit, the upper block 20 of said unit being pivotally connected to the swivel headblock 18 and the lower block 21 of the unit being pivotally connected by a yoke 22 to the conveyer 1 adjacent its outer end. The pull lead 23 leads to a power winch (not shown) mounted on machine 2.

By reason of the above described mounting and feed unit, loose material fed into the hopper 5 can continuously discharge onto the upper run of belt 16 of conveyer 1 regardless of the position of horizontal or vertical adjustment of said conveyer.

The conveyer 1, when moved for horizontal adjustment, swings about the center line of the hopper, and when vertically adjusted swings about the axis of trunnions 14. The inner end portion of the upper run of the conveyer 1 remains at all times in substantially the same position relative to hopper opening 8, and through which the material discharges from said hopper. This assures that all material from the hopper falls onto the conveyer regardless of its position of adjustment.

The tailings may be fed from the mining machine 2 into the hopper 5 by any suitable mechanism. In the present embodiment, however, the tailings are delivered from the mining machine by a horizontally disposed endless conveyer indicated generally at 24. The discharge end of said conveyer is positioned beyond the end of the main frame partially within and intersecting hopper 5, and is supported by brackets 25; the hopper being cut away symmetrical to said end portion of the conveyer 24 so as to permit said portion of the conveyer to be mounted as described.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In the combination of a hopper and an endless conveyer extending from under the hopper; means fixedly suspending the hopper, a circular ring fixed with the hopper at the bottom, a collar turnably surrounding the ring, legs depending from the collar on opposite sides and overlapping the sides of the conveyer, lateral trunnions connecting the conveyer and legs, and a retaining ring removably secured on the first named ring below the collar and extending radially out from said first named ring to support the collar radially inward of the legs.

2. In the combination of a hopper and an endless conveyer extending under the hopper; means fixedly suspending the hopper, a circular ring fixed with the hopper at the bottom, means suspending the conveyer for swivel movement in a vertical plane and including a collar turnable on the ring, and means on the ring forming an annular channel confining the collar against relative vertical movement.

3. A structure as in claim 2, in which said channel forming means includes a ring removably secured on the first named ring and underlying the collar.

STANLEY MARVIN.